US011185061B2

(12) United States Patent
Clayton et al.

(10) Patent No.: US 11,185,061 B2
(45) Date of Patent: Nov. 30, 2021

(54) FISHING ROD ATTACHMENT TO PRODUCE DRAG

(71) Applicants: Todd Clayton, Jarrettsville, MD (US); Timothy Canatella, Rising Sun, MD (US)

(72) Inventors: Todd Clayton, Jarrettsville, MD (US); Timothy Canatella, Rising Sun, MD (US)

(*) Notice: Subject to any disclaimer, the term of this patent is extended or adjusted under 35 U.S.C. 154(b) by 222 days.

(21) Appl. No.: 16/670,283

(22) Filed: Oct. 31, 2019

(65) Prior Publication Data

US 2020/0128806 A1    Apr. 30, 2020

Related U.S. Application Data

(60) Provisional application No. 62/753,132, filed on Oct. 31, 2018.

(51) Int. Cl.
*A01K 87/04* (2006.01)
*F16B 2/00* (2006.01)
*F16B 2/10* (2006.01)
*A01K 97/00* (2006.01)

(52) U.S. Cl.
CPC ............. *A01K 87/04* (2013.01); *A01K 97/00* (2013.01); *F16B 2/005* (2013.01); *F16B 2/10* (2013.01)

(58) Field of Classification Search
CPC .......... A01K 97/00; F16B 2/005; B65H 59/16
See application file for complete search history.

(56) References Cited

U.S. PATENT DOCUMENTS

| | | | | |
|---|---|---|---|---|
| 1,333,691 A | * | 3/1920 | Weiss | A01K 89/02 242/155 R |
| 2,913,845 A | * | 11/1959 | Baker | A01K 91/10 43/15 |
| 4,741,074 A | * | 5/1988 | Budano, II | A44B 99/00 224/269 |
| 4,873,780 A | * | 10/1989 | Lancette | A01K 87/00 43/25.2 |
| 5,129,174 A | | 7/1992 | Wilson | |
| 5,321,903 A | * | 6/1994 | Ebener | A01K 97/125 43/17 |
| 6,802,151 B1 | * | 10/2004 | Jochum | A01K 91/06 43/24 |

* cited by examiner

*Primary Examiner* — Robert Sandy
(74) *Attorney, Agent, or Firm* — RC Trademark Company

(57) ABSTRACT

According to some embodiments, a fishing rod attachment is disclosed. The fishing rod attachment is used to create drag on a fishing line. The fishing rod attachment device may include an upper jaw and a housing. The upper jaw is coupled to the housing where the housing includes (i) a lower jaw and (ii) a device clip to couple the housing to a fishing rod.

17 Claims, 7 Drawing Sheets

FISHING ROD ATTACHMENT TO PRODUCE DRAG

BACKGROUND

Drag systems are a mechanical means of applying variable pressure to a line spool or drive mechanism associated with a fishing reel in order to act as a friction brake against the line being taken by a fish. Drag supplies resistance to the line after hook-up by a fish (i.e., a fish takes the bait) to aid in landing the fish without the line breaking. In combination with rod flex and fishing technique, drag allows larger fish to be caught than the straight breaking strength of the line. However, drag systems may sometimes employ too much drag causing the fisherman to not notice that his bait is being taken and thus not being able to set the hook into the fish's mouth. It would therefore be desirable to provide a system to provide drag that is more sensitive to allow a fisherman to have more successful hook-ups.

SUMMARY

Some embodiments described herein relate to a fishing rod attachment that is used to create drag on a fishing line. The fishing rod attachment may comprise an upper jaw and a housing. The upper jaw may be coupled to the housing where the housing comprises (i) a lower jaw and (ii) a device clip to couple the housing to a fishing rod.

DETAILED DESCRIPTION

In the following detailed description, numerous specific details are set forth in order to provide a thorough understanding of the embodiments. However, it will be understood by those of ordinary skill in the art that the embodiments may be practiced without these specific details. In other instances, well-known methods, procedures, and components have not been described in detail so as not to obscure the embodiments. The embodiments described herein relate to a tensioning device to be used by a sport fisherman to control tension on a fishing line during an initial strike of a fish taking a bait while preventing unintended free spooling of the fishing line.

Figure 1:
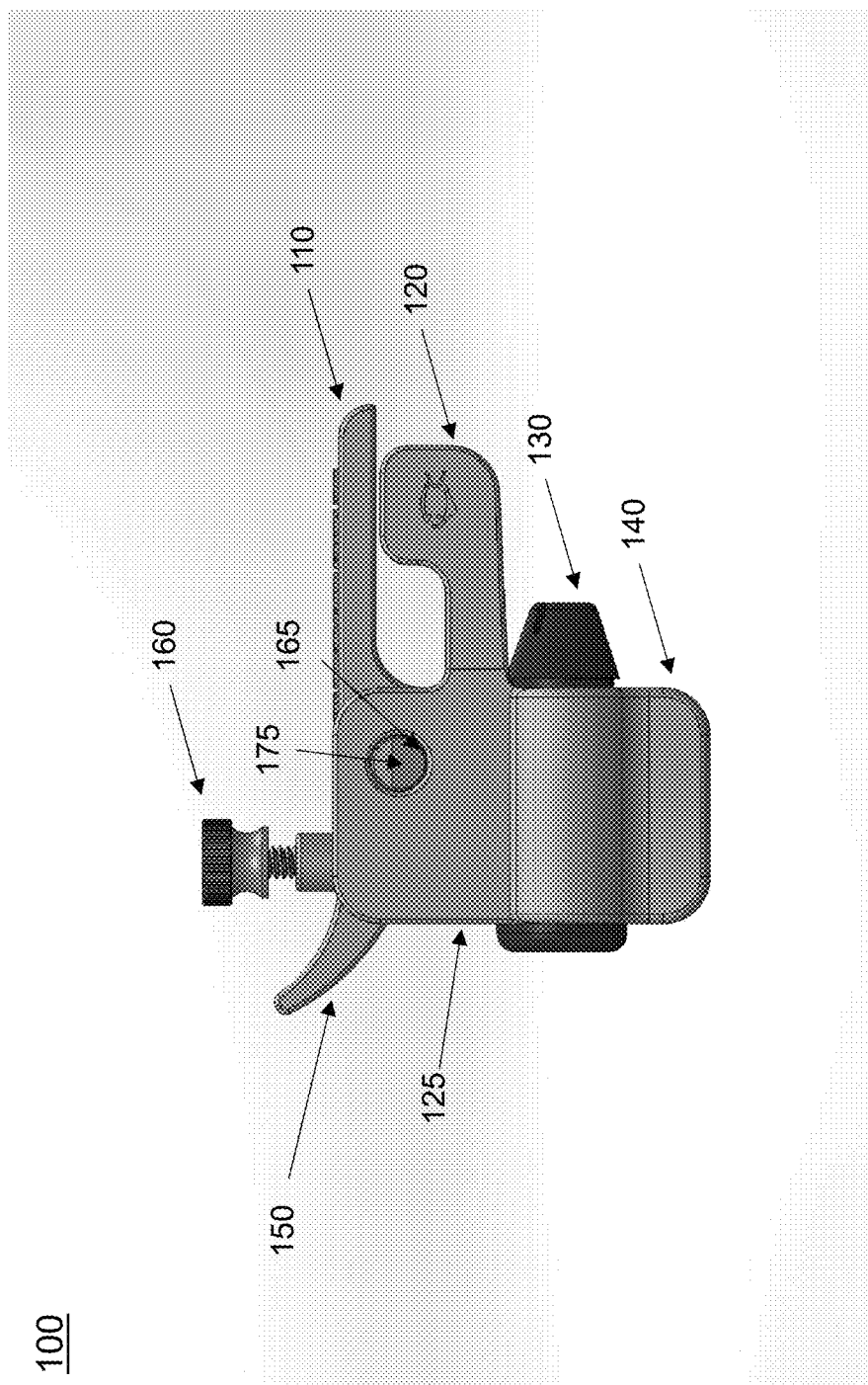
FIG. 1 illustrates a fishing rod attachment in accordance with some embodiments.
Figure 2:
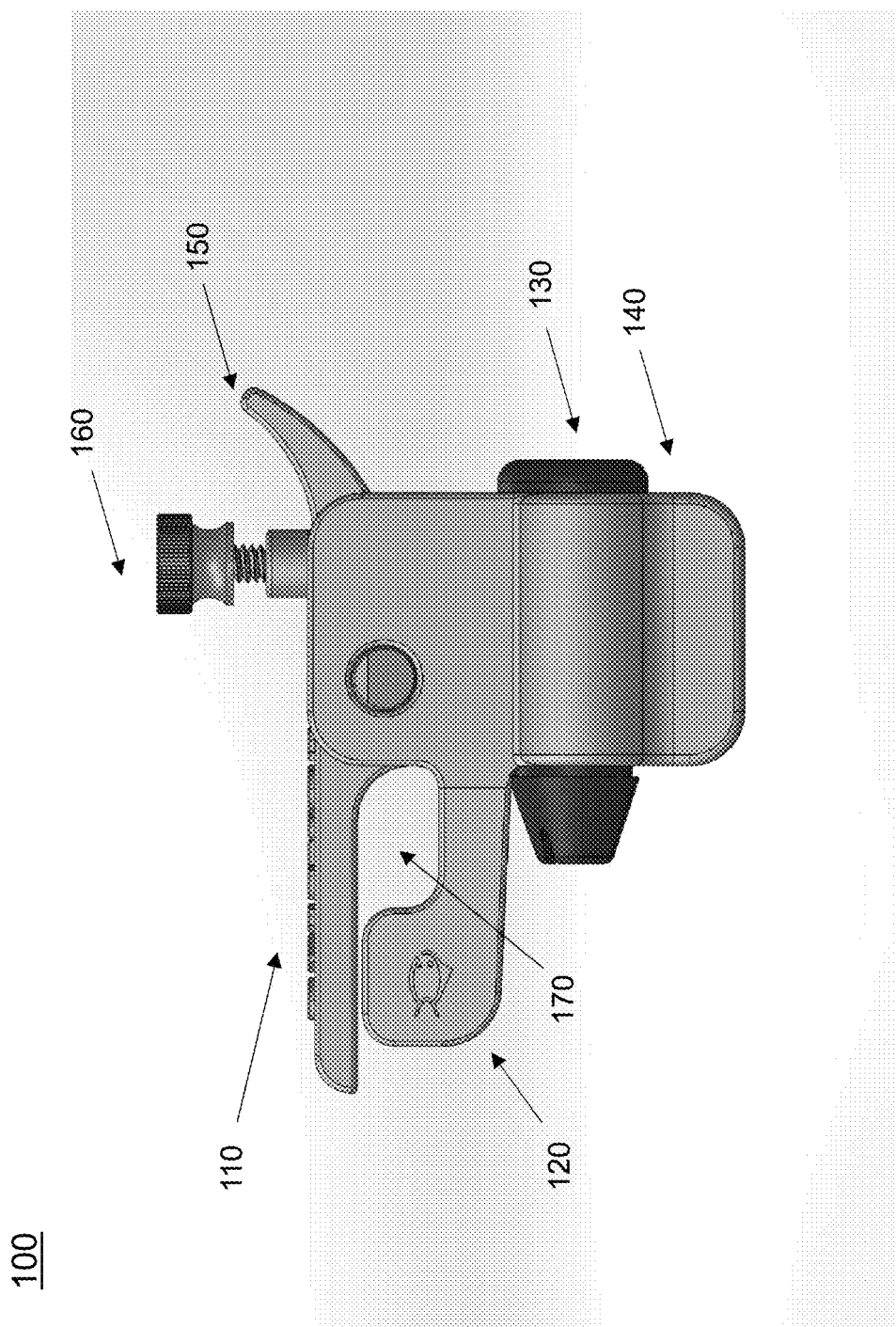
FIG. 2 illustrates a fishing rod attachment in accordance with some embodiments.

Now referring to FIG. 1 and FIG. 2, an embodiment of a fishing rod attachment 100 is illustrated. FIG. 1 may relate to a right-side view of the fishing rod attachment 100 and FIG. 2 may relate to a left side view of the fishing rod attachment 100. The fishing rod attachment 100 comprises an upper jaw 110, a housing 125, a tension screw 160, a spring 180 and a flexible insert 130. The housing comprises a lower jaw 120, a device clip 140 to receive a fishing rod/pole, a plurality of openings 165, and a textured area 190. The upper jaw 110 further comprises a trigger 150 and protuberances 175 that each fit into a respective one of the plurality of openings 165.

Figure 6:
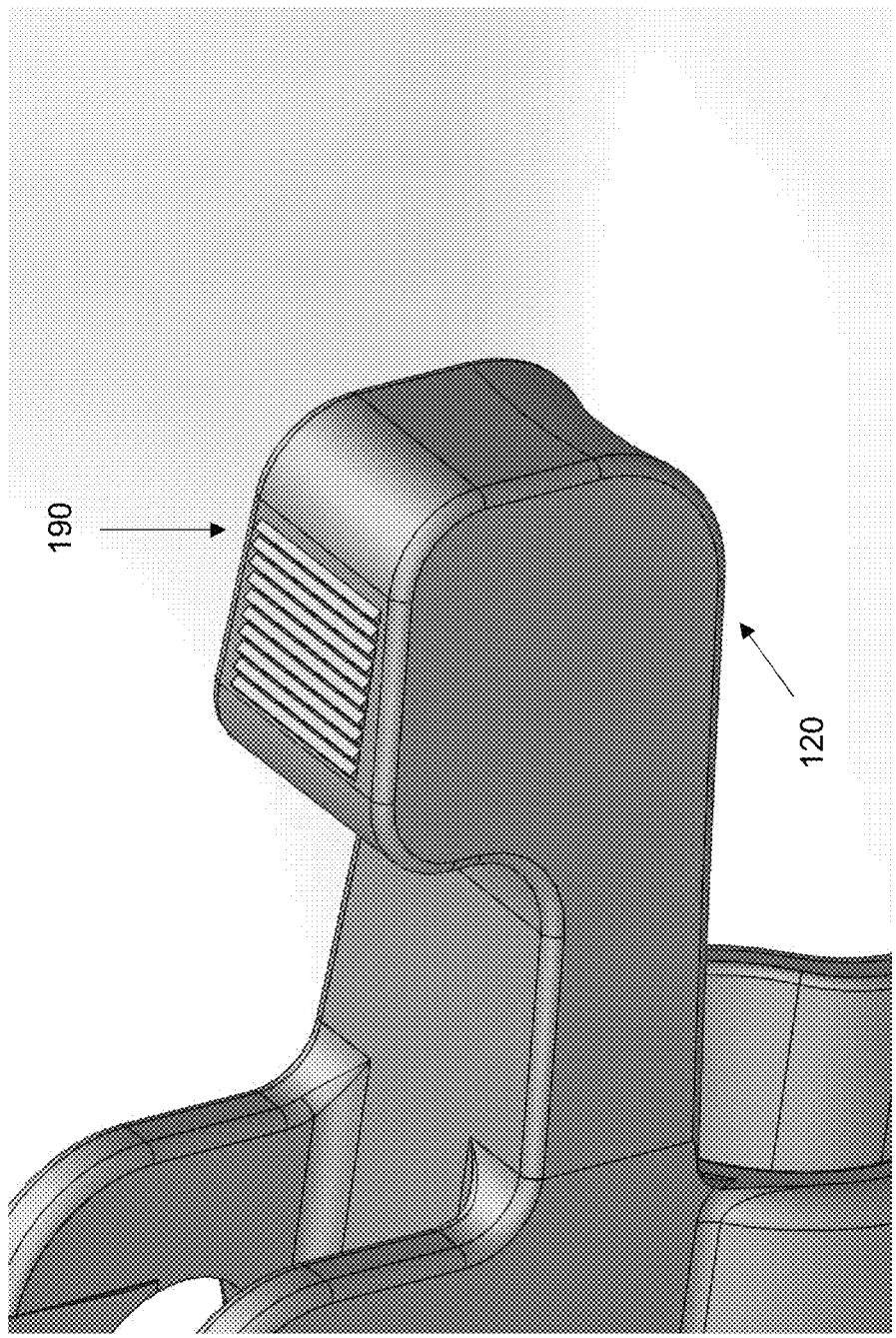
FIG. 6 illustrates a portion of a fishing rod attachment in accordance with some embodiments.

The upper jaw 110 may extend horizontally from the housing 125 with a trigger 150 at a first end and further comprising a distal end to press against the textured area 190 of the lower jaw 120. The textured area, as shown in FIG. 6, comprises a plurality of raised areas to grab a fishing line. In particular, the raised areas may comprise a plurality of parallel raised horizontal areas where a line may rest between two of the plurality of parallel raised horizontal areas. Furthermore, by providing a raised area 190 on only one of the jaws (e.g., the lower jaw 120), and having a corresponding/mating surface of the other jaw (e.g., the upper jaw 110) being smooth, a force less than that needed for a traditional drag may be needed for a fishing line and still provide the benefits of a traditional drag. As illustrated, an upper surface of a distal end of the lower jaw 120 is textured and a lower surface of a distal end of the upper jaw 110 is smooth.

The trigger 150 may comprise a curved portion to receive a finger and to provide leverage to pivot the upper jaw 110 around the protuberances 175. The distal end of the upper jaw 110 may move in an upward direction when the trigger 150 is pushed down (e.g., the upper jaw 110 may pivot around openings 165). An upward force on the upper jaw 110 (e.g., a force to keep the upper jaw 110 pressed against the lower jaw 120) may be provided by spring 180 which may be compressed or adjusted by tension screw 160. The spring 180 may comprise any conventional spring such as, but not limited to, a compression spring or a leaf spring. The housing 125 may comprise an opening 170 located between the upper jaw 110 and the lower jaw 120 for ease of closing the jaws 110/120 while keeping a finger between the jaws 110/120 to ensure that a fishing line is secured between the upper jaw 110 and the lower jaw 120. The opening 170 may be large enough for a fisherman to place a finger inside to hold a line against the textured area 190 while closing the upper jaw 110.

The device clip 140 may allow the fishing rod attachment 100 to snap onto a fishing rod (pole) by means of a friction fit between the device clip 140 and the rod. To facilitate the friction fit, a flexible insert 130 may be used where the insert comprises a flexible material such as, but not limited to, rubber or a flexible plastic. The fishing rod attachment 100 may be positioned over the fishing reel in proximity to a spool where the fishing line is wound. The device clip 140 may be comprised of a deflective plastic material that may flex to open and slip over the diameter of the rod. The device clip 140 may return to the un-restrained state and clamp onto the rod diameter. The device clip 140 may also use a screw, or other fastener, (not shown) to draw the device clip 140 tight around the rod diameter. The device clip 140 may be held in place by a friction fit, and the device clip 140 may be rotated around the rod to be set in a desired position for use and tension control.

Figure 3:
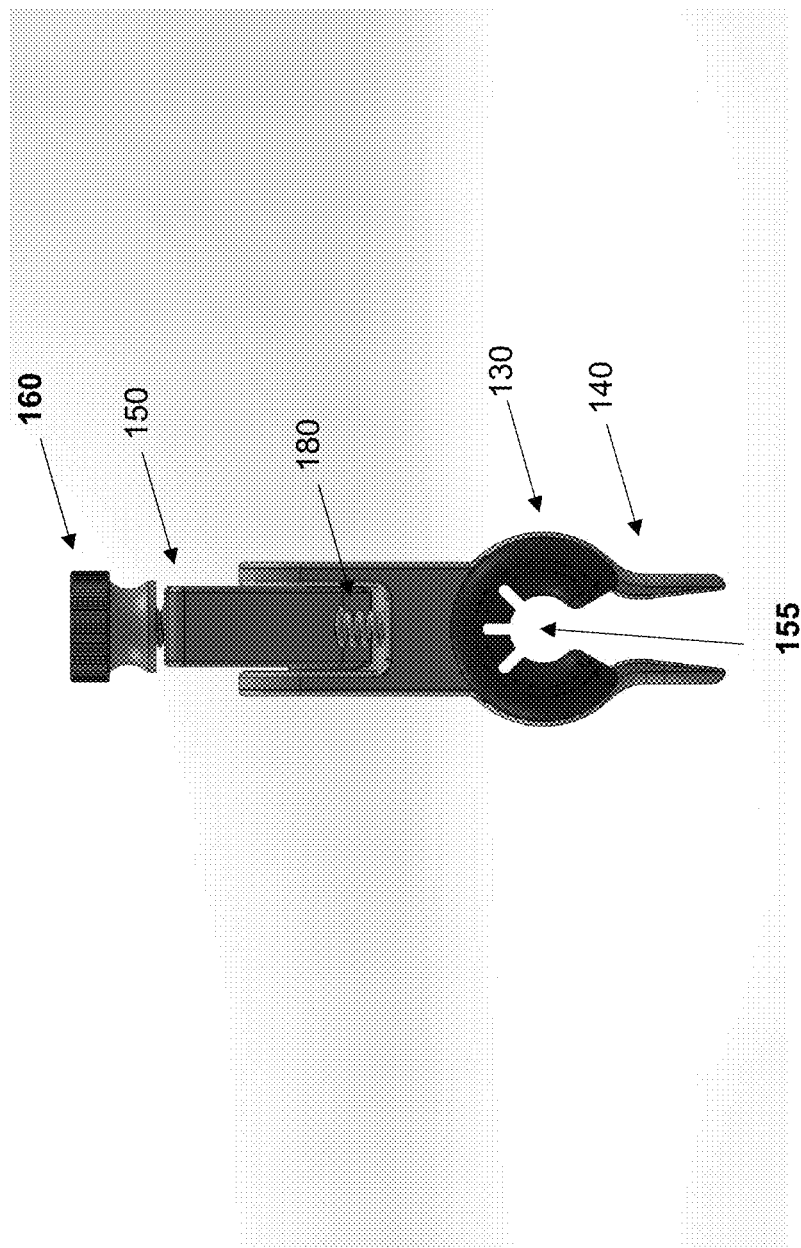
FIG. 3 illustrates a fishing rod attachment according to some embodiments.
Figure 4:
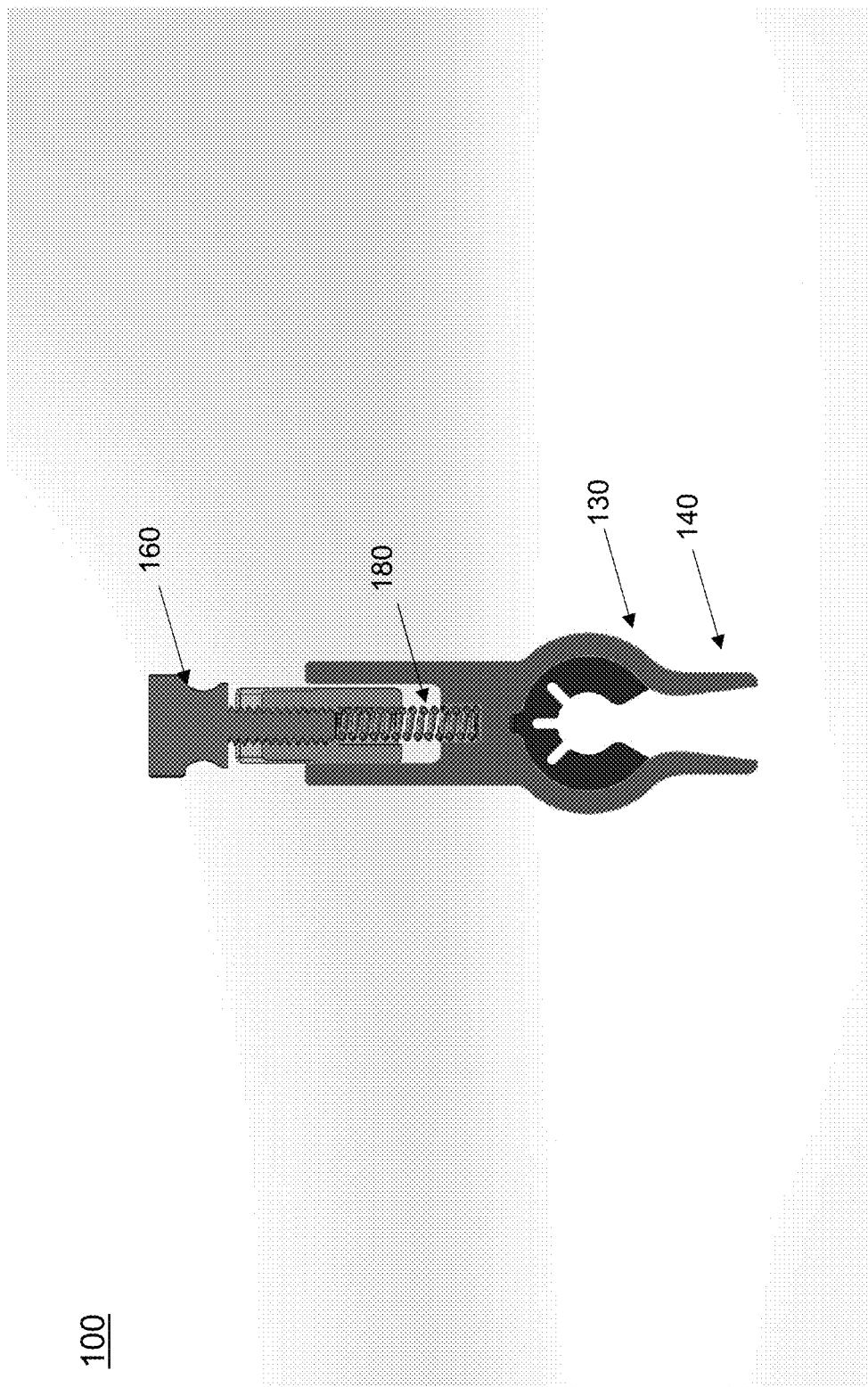
FIG. 4 illustrates a cross sectional view of a fishing rod attachment in accordance with some embodiments.
Figure 5:
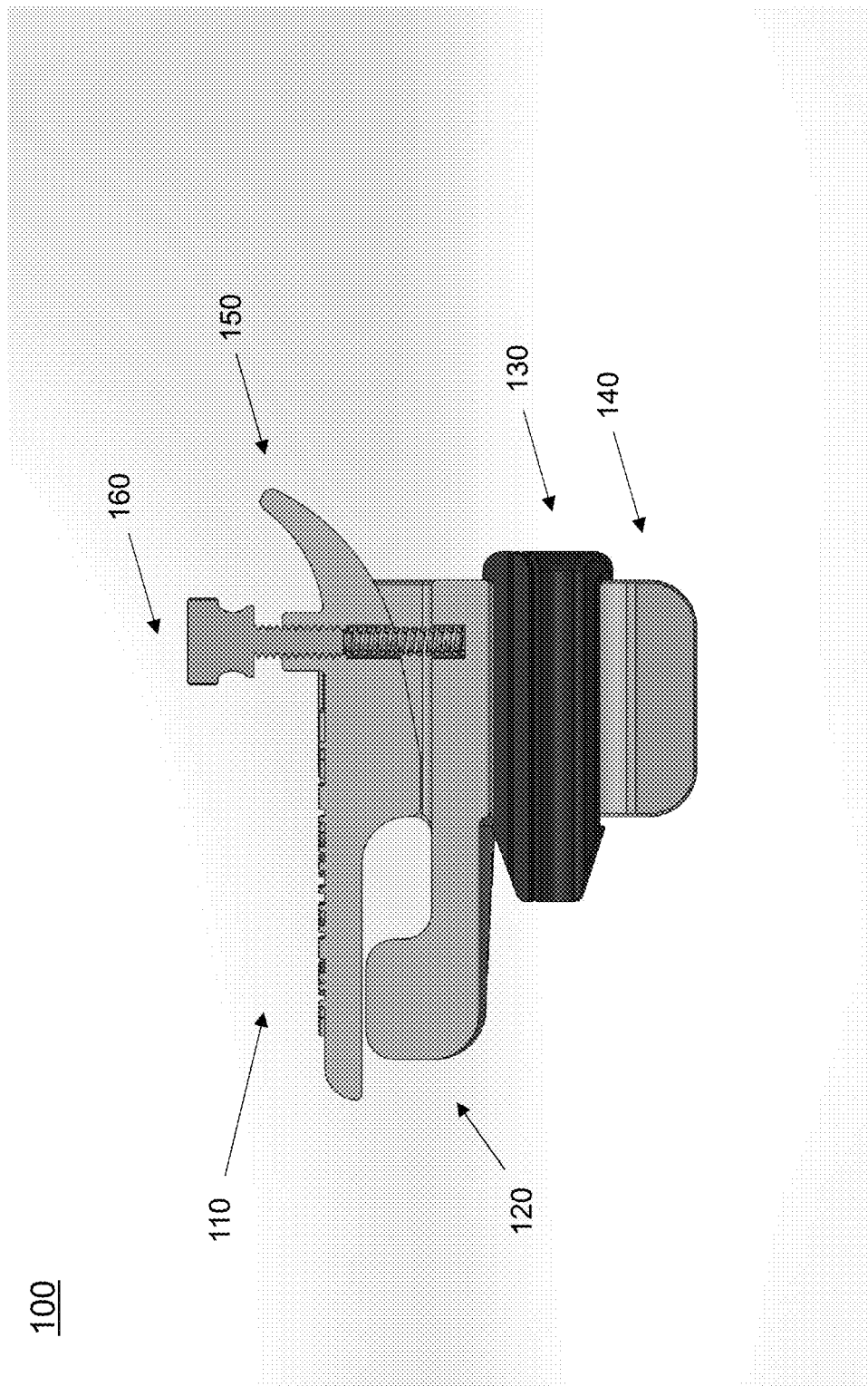
FIG. 5 illustrates a cross sectional view of a fishing rod attachment in accordance with some embodiments.

FIG. 3 illustrates a back-side view of the fishing rod attachment 100 and FIG. 4 illustrates a cut-away view from a back-side perspective. As illustrated in FIG. 3 and FIG. 4, the insert 130 may comprise a plurality of flexible portions 155 to compress and grip a fishing pole. By compressing against the fishing pole, the flexible portions create greater friction to hold the device clip 140 in place. FIG. 3 and FIG.

4 further illustrate that the spring 180 may be compressed between the upper jaw 110 and the housing 125.

Figure 7:
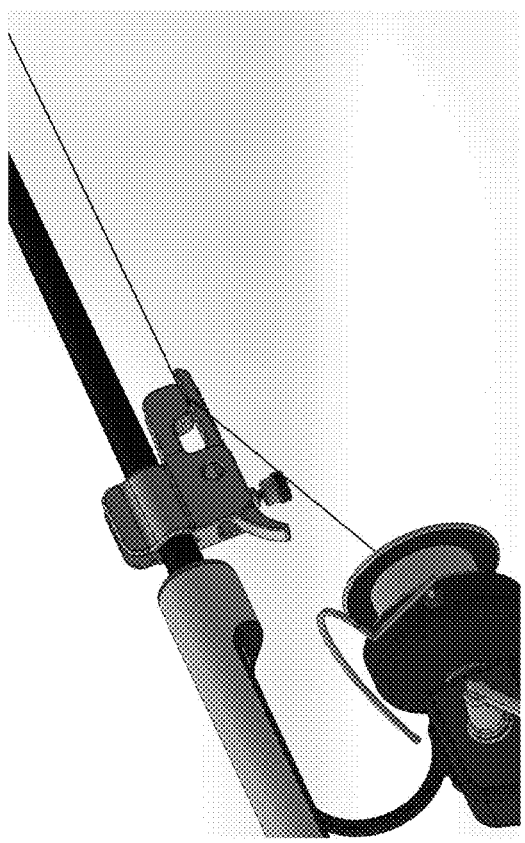
FIG. 7 illustrates a fishing rod attachment affixed to a fishing rod in accordance with some embodiments.
Figure 8:
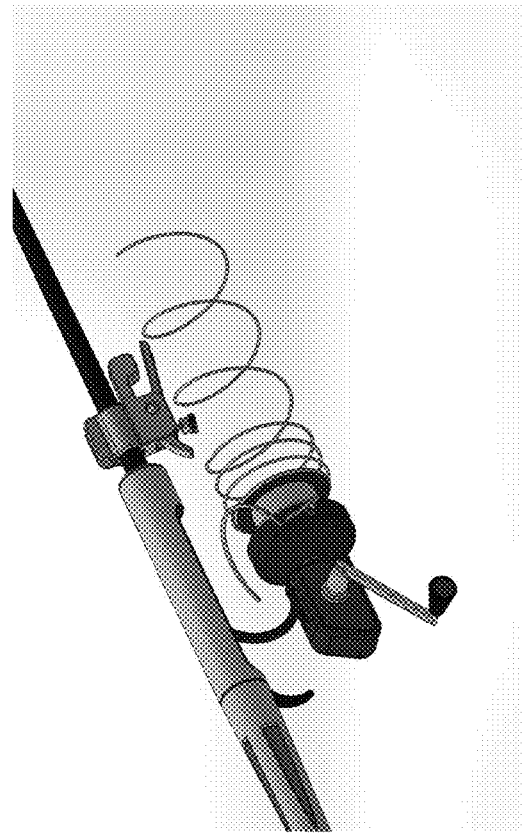
FIG. 8 illustrates a fishing rod attachment affixed to a fishing rod in accordance with some embodiments.

As illustrated in FIG. 7 and FIG. 8, when the fishing rod attachment 100 is in use on a fishing pole, a fisherman may open a bale of the fishing reel, release the line lock, or loosen primary drag setting on the reel and loop the fishing line through between the upper jaw 110 and the lower jaw 120. As illustrated in FIG. 7, the upper jaw 110 may then be lowered onto the lower jaw 120 and the fishing rod attachment 100 becomes the primary drag system with the reel becoming a secondary drag system to prevent the fishing line from free spooling from the reel spool while holding tension on the line to the hook. The fishing rod attachment 100 may hold the line (including a hook and bait) against underwater currents, tidal flow and trolling pulls on the bait. The tension of the fishing rod attachment 100 set by the tension screw 160 may determine how much force is held against the fish strike for making the catch. The release of the drag occurs when the fish strike exceeds the drag set force of the fishing rod attachment 100 and the line slips free of the fishing rod attachment 100 at which instant the line can free spool until the fisherman engages the drag of the fishing reel which has become the secondary drag when using the device. This is illustrated in FIG. 8.

The benefit of the device is to allow the fisherman to set a very light primary drag that allows the fish to take the bait into its mouth without sensing a force or pull of a stronger drag tension. The result may be fewer lost catches (i.e., more hook-ups) due to the fish refusing the bait due to an un-natural tug on the bait before the hook can be set. Once the bait is taken and the hook set, the primary drag of the device is released and the fish can run with the bait until the fisherman engages the secondary drag of his fishing reel.

The fishing rod attachment 100 is easy to install and store and is intuitive to use and a fisherman becomes proficient with practice. The fishing rod attachment 100 is small and un-obtrusive in use. The fishing rod attachment 100 can fit into a tackle box or user's pocket. The fishing rod attachment 100 is weatherable in salt water environment. The fishing rod attachment 100 is maintenance free and requires no other care for usability.

This written description uses examples to disclose multiple embodiments, including the preferred embodiments, and also to enable any person skilled in the art to practice the invention, including making and using any devices or systems and performing any incorporated methods.

Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A fishing rod attachment to create drag on a fishing line, the device comprising:
   a housing comprising (i) a lower jaw and (ii) a device clip to receive a fishing rod; and
   an upper jaw pivotally coupled to the housing, where a fishing line is to be removably coupled between the upper jaw and the lower jaw, wherein an upper surface of a distal end of the lower jaw is textured and a lower surface of a distal end of the upper jaw is smooth.

2. The fishing rod attachment of claim 1, wherein the textured lower jaw comprises a plurality of parallel raised horizontal areas where a line may rest between two of the plurality of parallel raised horizontal areas.

3. The fishing rod attachment of claim 1, wherein the device clip comprises a flexible insert.

4. The fishing rod attachment of claim 1, further comprising a spring disposed between the upper jaw and the housing.

5. The fishing rod attachment of claim 1, further comprising a tension screw to adjust a spring disposed between the upper jaw and the housing.

6. The fishing rod attachment of claim 1, wherein the housing comprises a plurality of openings to pivotally couple the upper jaw to the housing and to facilitate pivoting of the upper jaw.

7. A fishing rod attachment to create drag, the device comprising:
   a housing comprising (i) a lower jaw, (ii) a device clip to receive a fishing rod and (iii) a plurality of openings to pivotably couple an upper jaw to the housing and to facilitate pivoting of the upper jaw; and
   the upper jaw pivotally coupled to the housing, where a fishing line is to be removably coupled between a downward facing distal end of the upper jaw that comprises a smooth surface and an upward facing distal end of the lower jaw that comprises a textured surface.

8. The fishing rod attachment of claim 7, wherein the device clip comprises a flexible insert.

9. The fishing rod attachment of claim 7, further comprising a spring disposed between the upper jaw and the housing.

10. The fishing rod attachment of claim 7, further comprising a tension screw to adjust a spring disposed between the upper jaw and the housing.

11. A fishing rod attachment to create drag, the device comprising:
    an upper jaw;
    a housing to pivotably couple the upper jaw where the housing comprises (i) a lower jaw and (ii) a device clip to receive a fishing rod, where a fishing line is to be held between the upper jaw and the lower jaw; and
    a spring disposed between the upper jaw and the housing, wherein an upper surface of a distal end of the lower jaw is textured and a lower surface of a distal end of the upper jaw is smooth.

12. The fishing rod attachment of claim 11, wherein the textured lower jaw comprises a plurality of parallel raised horizontal areas where a line may rest between two of the plurality of parallel raised horizontal areas.

13. The fishing rod attachment of claim 11, wherein the device clip comprises a flexible insert.

14. The fishing rod attachment of claim 13, wherein the flexible insert comprises a plurality of flexible portions to compress and grip a fishing pole.

15. The fishing rod attachment of claim 11, further comprising a tension screw to adjust the spring disposed between the upper jaw and the housing.

16. The fishing rod attachment of claim 11, wherein the housing comprises a plurality of openings to pivotally couple the upper jaw and to facilitate pivoting of the upper jaw.

17. The fishing rod attachment of claim 11, wherein an opening between the lower jaw and the upper jaw is large enough for a fisherman to place a finger inside to hold a line against a textured area of the lower jaw.

* * * * *